US008367946B2

(12) United States Patent
Inauen et al.

(10) Patent No.: US 8,367,946 B2
(45) Date of Patent: Feb. 5, 2013

(54) MICROMETERING DEVICE

(75) Inventors: Claude Inauen, Gallen (CH); Heinz Brand, Speicher (CH)

(73) Assignee: Bühler AG, Uzwil (CH)

( * ) Notice: Subject to any disclaimer, the term of this patent is extended or adjusted under 35 U.S.C. 154(b) by 633 days.

(21) Appl. No.: 12/443,772

(22) PCT Filed: Aug. 23, 2007

(86) PCT No.: PCT/CH2007/000420
§ 371 (c)(1),
(2), (4) Date: Dec. 22, 2009

(87) PCT Pub. No.: WO2008/025181
PCT Pub. Date: Mar. 6, 2008

(65) Prior Publication Data
US 2010/0089667 A1  Apr. 15, 2010

(30) Foreign Application Priority Data
Sep. 1, 2006 (DE) .................... 10 2006 041 298

(51) Int. Cl.
*G01G 13/02* (2006.01)
*G01G 13/08* (2006.01)

(52) U.S. Cl. ............... 177/50; 177/60; 177/116; 222/77

(58) Field of Classification Search .......... 222/55, 222/56, 77; 177/50, 60, 116
See application file for complete search history.

(56) References Cited

U.S. PATENT DOCUMENTS

| | | | | |
|---|---|---|---|---|
| 3,319,828 A | * | 5/1967 | Maxwell | 222/1 |
| 4,491,243 A | * | 1/1985 | Koga et al. | 222/55 |
| 5,405,049 A | * | 4/1995 | Ricciardi | 222/1 |
| 5,423,455 A | * | 6/1995 | Ricciardi et al. | 222/1 |
| 5,627,346 A | | 5/1997 | Weibel et al. | |
| 5,670,751 A | * | 9/1997 | Hafner | 177/1 |
| 5,753,868 A | * | 5/1998 | Diem | 177/70 |
| 6,722,294 B2 | * | 4/2004 | Cabrera-Llanos et al. | 110/341 |
| 6,802,434 B2 | * | 10/2004 | Johnson et al. | 222/1 |
| 7,175,048 B2 | * | 2/2007 | Wolfschaffner | 222/77 |
| 2005/0145420 A1 | * | 7/2005 | Wolfschaffner | 177/116 |

FOREIGN PATENT DOCUMENTS

| | | |
|---|---|---|
| DE | 36 17 200 A1 | 11/1987 |
| DE | 90 14 491 U1 | 4/1991 |
| DE | 198 20 709 A1 | 11/1998 |
| EP | 0 697 357 B1 | 10/1997 |
| GB | 1 601 568 A | 10/1981 |
| JP | 61-018642 A | 1/1986 |
| WO | WO 2004/042334 A1 | 5/2004 |

OTHER PUBLICATIONS

International Search Report from the European Patent Office for International Application No. PCT/CH2007/000420, (mailing date Nov. 2, 2007).

Translation of the International Preliminary Report on Patentability from the European Patent Office for International Application No. PCT/CH2007/000420, (completion date of Nov. 24, 2008 and made available on Mar. 1, 2009).

* cited by examiner

*Primary Examiner* — Randy W Gibson
(74) *Attorney, Agent, or Firm* — Finnegan, Henderson, Farabow, Garrett & Dunner LLP

(57) ABSTRACT

A micrometering device for metering and weighing free-flowing bulk materials, such as, for example, flour, powder or fine-grain granules, is described. A reliable weighing with small batch sizes may be achieved, by arranging a weighing container for the weighing device separate from a reservoir for the product for weighing.

10 Claims, 1 Drawing Sheet

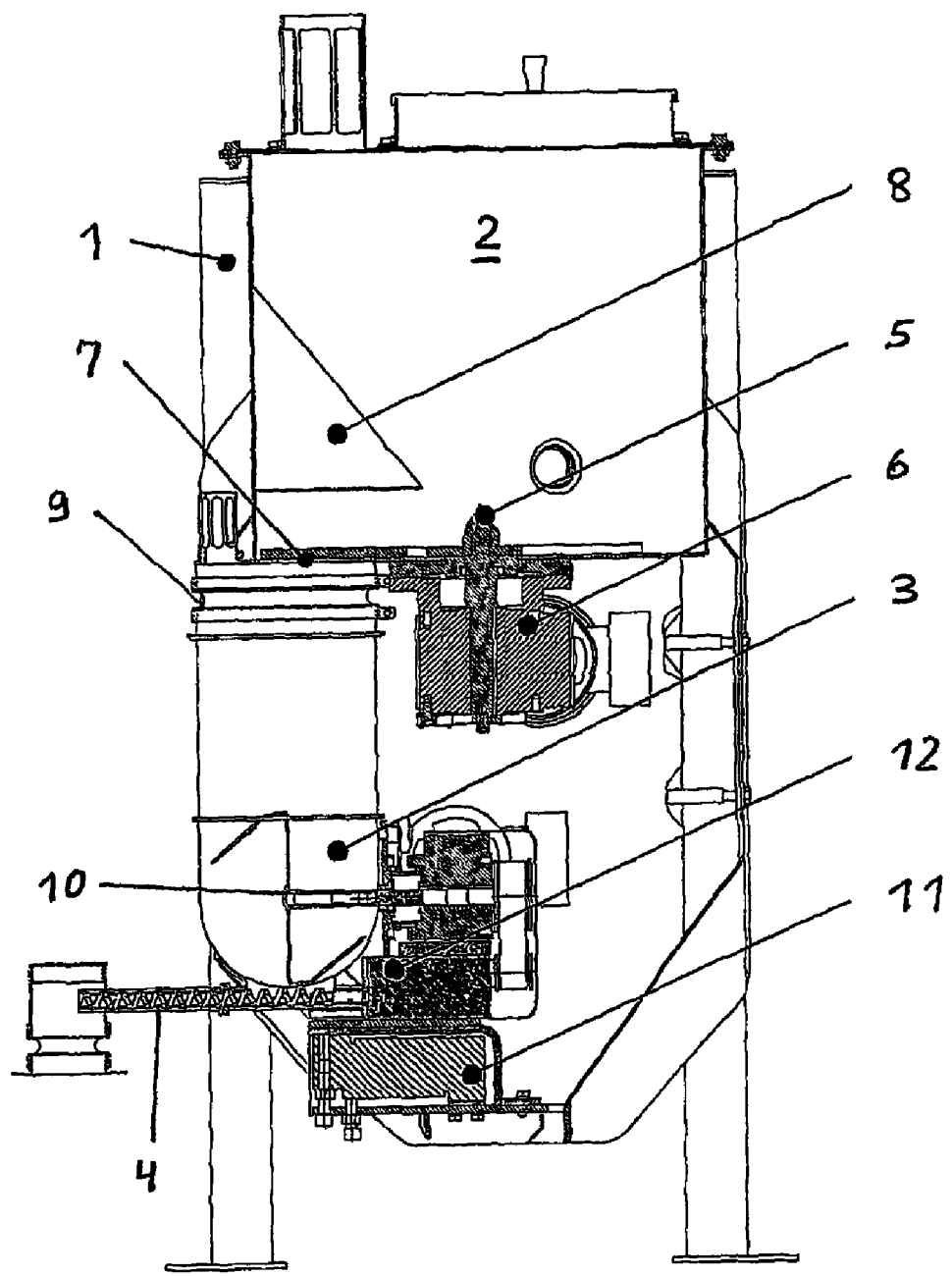

MICROMETERING DEVICE

The invention relates to a micrometering device for metering and weighing free-flowing and not free-flowing bulk materials such as flours, powder, additives or fine-grain granules.

Devices for micrometering are known. Thus, EP-B-697357 describes micrometering equipment in which a metering scale consists of a weighing container hung on weighing elements and having discharge auxiliary means and bases with openings, wherein a product transfer opening is arranged in a base directly above the catchment area of a metering screw. In a similar stirring machine with an integrated intermediate base as per JP-A-6118642, a hollow cone with a through-opening is used instead of a stirrer. The intermediate base is intended to be able to support a large product column; the weighing is precise.

Moreover, metering devices with a vertically arranged supply element are known, for example by means of a rotary table mounted vertical screw. Herein, a 100% filling of the screw and a large adjustment range are intended to be achieved in conjunction with a compact design. So that badly flowing products can also be supplied, GB-A-1601568 additionally proposes the arrangement of a stirrer.

In general, a vertical arrangement can result in the product "shooting through".

In a metering module as per DE-A-3617200, the metering unit is intended to be decoupled from the weighing container. This makes the weighing container lighter and the relationship between product to be weighed and tare is improved.

The invention is based on the object of developing a micrometering device for metering and weighing free-flowing bulk materials such as flours, powder or fine-grain granules, which device affords the possibility of both precisely weighing small product quantities (batches) and very precisely regulating continuous product flows.

The object is achieved by the features of patent claim 1. It is characterized by a decoupling of the storage and scale, with a significantly simplified design with increased weighing accuracy being achieved compared to the prior art. In particular, pressure variations in the weighing container are avoided.

The dependent claims disclose preferred embodiments.

A simple, modular design can be achieved and it can also be extended to gravimetric weighing in addition to volumetric weighing.

The micrometering device is designed in a sanitation-friendly fashion, emptying is possible with very small quantities remaining. Bridging and product differences in the storage are avoided. The micrometering device has a small gross weight. The storage can automatically be refilled as a result of the decoupling.

In the following text, an exemplary embodiment is used to describe the invention in more detail on the basis of a drawing. The drawing shows the micrometering device in a sectional illustration.

BRIEF DESCRIPTION OF THE DRAWINGS

The Figure shows the micrometering device according to an embodiment.

DETAILED DESCRIPTION OF THE INVENTION

Storage 2, weighing container 3, and discharge screw 4, as well as the other components of the micrometering device, are held by a frame 1.

The storage 2 arranged as a reservoir above the weighing container 3 has a base clearing device 5 with a drive device 6. As a result of this, the product situated in the storage 2 is loosened and discharged into the weighing container 3 through an opening 7 in the base of the storage. A physically designed lug 8 arranged on the wall of the storage 2 such that it covers the opening 7 deflects the product to be discharged and so the product pressure is relieved and an uncontrolled refilling of the weighing container 3 is prevented. Moreover, the stability of the refilling is improved, even in the case of bulk density variations. Furthermore, the base clearing device 5 can be provided with a scraper (not illustrated).

The storage is separated from this weighing container 3 arranged therebelow in terms of weighing technology, with merely a flexible sleeve 9 being arranged in the region of the opening 7 to the weighing container 3 in order to satisfy sanitation requirements and minimize pressure variations. The sleeve 9 extends at least without a gap up to the base of the reservoir 2 and is secured against damage by means of supports.

The weighing container 3 is arranged on only one measuring cell 11 secured against excessive load and comprises a stirrer 10 with drive unit 12.

The weighing container 3 can also be designed as a negative cone to avoid bridging.

The discharge screw 4 is designed as a double helical screw without a core and is likewise driven by the drive unit 12. A belt transmission affords the possibility of a large power range.

The storage 2 is significantly larger than the weighing container 3 and affords the possibility of weighing a plurality of batches without refilling.

REFERENCE SIGNS

1 Frame
2 Storage
3 Weighing container
4 Discharge screw
5 Base clearing device
6 Drive device
7 Opening
8 Lug
9 Sleeve
10 Stirrer
11 Measuring cell
12 Drive unit

The invention claimed is:

1. A micrometering device configured for metering, weighing, and regulating a continuous flow of a bulk material product, comprising:
   a reservoir for the bulk material product, said reservoir having a base opening, and containing a base clearing device and a further element configured to deflect the bulk material product; and
   a weighing device including a weighing container and a discharge device;
   wherein the weighing device is arranged downstream of the reservoir, and wherein the reservoir and the weighing container are decoupled in terms of weighing technology; and
   wherein the further element is positioned such that a pressure of the bulk material product is reduced so as to prevent an uncontrolled refilling of the weighing container.

2. The micrometering device as claimed in claim 1, wherein the base opening is disposed over the weighing container.

3. The micrometering device as claimed in claim 1, wherein the further element is arranged so as to deflect the bulk material product away from the base opening.

4. The micrometering device as claimed in claim 1, wherein, in the region of the base opening of the reservoir, the weighing container is provided with a flexible sleeve which extends without a gap up to the base of the reservoir.

5. The micrometering device as claimed in claim 1, wherein the reservoir includes a substantially greater volume than the weighing container.

6. The micrometering device as claimed in claim 1, wherein the weighing device further comprises a single measuring cell upon which the weighing container is disposed.

7. The micrometering device as claimed in claim 1, wherein the discharge device includes a discharge screw.

8. The micrometering device as claimed in claim 7, wherein the discharge screw is a double helical screw without a core.

9. The micrometering device as claimed in claim 1, wherein the weighing container comprises a negatively conical shape.

10. The micrometering device as claimed in claim 1, wherein the base opening is positioned at a downstream-most end of the reservoir.

* * * * *